(12) United States Patent
Kim

(10) Patent No.: US 8,402,338 B2
(45) Date of Patent: Mar. 19, 2013

(54) METHOD OF ERROR CONTROL

(75) Inventor: Yong Ho Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 12/744,917

(22) PCT Filed: Dec. 9, 2008

(86) PCT No.: PCT/KR2008/007271
§ 371 (c)(1),
(2), (4) Date: Jul. 7, 2010

(87) PCT Pub. No.: WO2009/075507
PCT Pub. Date: Jun. 18, 2009

(65) Prior Publication Data
US 2010/0306614 A1 Dec. 2, 2010

Related U.S. Application Data

(60) Provisional application No. 61/012,787, filed on Dec. 11, 2007.

(30) Foreign Application Priority Data

Jul. 21, 2008 (KR) .................. 10-2008-0070504

(51) Int. Cl.
*H03M 13/00* (2006.01)
(52) U.S. Cl. ........................ 714/752; 714/819
(58) Field of Classification Search .................. 714/752, 714/819
See application file for complete search history.

(56) References Cited

U.S. PATENT DOCUMENTS

| 5,715,355 | A | 2/1998 | Yonemitsu et al. |
| 6,418,549 | B1 | 7/2002 | Ramchandran et al. |
| 6,615,382 | B1 | 9/2003 | Kang et al. |
| 6,647,528 | B1 * | 11/2003 | Collette et al. ............. 714/758 |
| 7,213,189 | B2 | 5/2007 | Malm |
| 7,320,091 | B2 * | 1/2008 | Blaauw et al. ............. 714/30 |

(Continued)

FOREIGN PATENT DOCUMENTS

| EP | 0 674 316 B1 | 9/1995 |
| EP | 1 623 514 B1 | 2/2006 |

(Continued)

OTHER PUBLICATIONS

Fossorier et al., "Computationally Efficient Soft-Decision Decoding of Linear Block Codes Based on Ordered Statistics", IEEE Transactions on Information Theory, vol. 42, No. 3, May 1996.

(Continued)

*Primary Examiner* — Yolanda L Wilson
(74) *Attorney, Agent, or Firm* — Birch, Stewart, Kolasch & Birch, LLP

(57) ABSTRACT

A method of error control in a wireless access system is disclosed. More particularly, a method of error control using a random liner coding method is disclosed. A method of error control in a wireless access system comprises receiving code blocks generated as data blocks included in a data block set are randomly linear-coded; decoding a predetermined number of code blocks to a first data block set, wherein the predetermined number of code blocks are selected from the code blocks; replacing one or more code blocks among the predetermined number of code blocks with code blocks other than the predetermined number of code blocks selected from the code blocks and decoding them to a second data block set; and comparing the first data block set with the second data block set.

15 Claims, 3 Drawing Sheets

U.S. PATENT DOCUMENTS

| | | | |
|---|---|---|---|
| 7,391,723 B2 * | 6/2008 | Collette et al. | 370/230 |
| 2004/0071093 A1 | 4/2004 | Kim | |
| 2006/0149753 A1 | 7/2006 | Medard et al. | |
| 2007/0025425 A1 | 2/2007 | El Nahas El Homsi et al. | |
| 2009/0187804 A1 * | 7/2009 | Shen et al. | 714/752 |
| 2010/0260241 A1 * | 10/2010 | Kim | 375/219 |
| 2010/0296601 A1 * | 11/2010 | Kim | 375/295 |
| 2011/0041041 A1 * | 2/2011 | Kim | 714/780 |
| 2011/0044180 A1 * | 2/2011 | Kim | 370/242 |
| 2011/0173517 A1 * | 7/2011 | Kim | 714/776 |

FOREIGN PATENT DOCUMENTS

| | | |
|---|---|---|
| KR | 10-2001-0010277 A | 2/2001 |
| KR | 10-2004-0033203 A | 4/2004 |

OTHER PUBLICATIONS

Fossorier et al., "Soft-Decision Decoding of Linear Block Codes Based on Ordered Statistics", IEEE Transaction on Information Theory, vol. 41, No. 5, Sep. 1995.

* cited by examiner

Move the decoding window with step size of n blocks until the end.
(4decoding blocks in this example)

(a)

Move the decoding window with step size of n blocks until the end.
(4decoding blocks in this example)

(b)

(a)

(b)

Move the decoding window with step size of n blocks until the end.

(c)

METHOD OF ERROR CONTROL

This application is the National Phase of PCT/KR2008/007271 filed on Dec. 9, 2008, which claims priority under 35 U.S.C. 119(e) to U.S. Provisional Application No. 61/012,787 filed on Dec. 11, 2007 and under 35 U.S.C. 119(a) to Patent Application No. 10-2008-0070504 filed in Republic of Korea on Jul. 21, 2008, all of which are hereby expressly incorporated by reference into the present application.

TECHNICAL FIELD

The present invention relates to a method of error control in a wireless access system, and more particularly, to a method of error control using a random liner coding method.

BACKGROUND ART

Error control means a method of detecting and correcting an error occurring during data transmission. Hereinafter, an error control scheme will be described in brief.

The error control scheme can be divided into an automatic repeat request (ARQ) scheme, a forward error correction (FEC) scheme, and a backward error correction (BEC) scheme.

According to the ARQ scheme, a receiver checks whether an error has occurred, and requests retransmission for a part where an error has occurred. Namely, according to the ARQ scheme, the receiver checks whether an error has occurred using acknowledgement (ACK) and time out, and a transmitter retransmits a frame where an error has occurred.

According to the FEC scheme, the transmitter transmits a text message or frame by adding redundancy information thereto, so that the receiver detects and corrects an error using the redundancy information when the error is found. Namely, according to the FEC scheme, the transmitter transmits data by adding redundancy information, which can correct an error, to the data, and the receiver corrects the error through the redundancy information.

According to the BEC scheme, the transmitter transmits a text message or frame by adding redundancy information, which can detect an error, to the text message or frame, and the receiver requests the transmitter of retransmission when the error is found.

An error detection code and an error correction code are used for the error control scheme.

The error detection code is added to data so that the receiver can identify the presence of an error occurring during data transmission. Examples of the error control scheme which uses the error detection code include parity check, check sum, and cyclic redundancy checking (CRC).

The parity check is most generally used when a small number of information bits are provided and the probability of error is low. Since the parity check can simply be performed, it is mainly used for asynchronous communication. However, the parity check has a drawback in that error detection cannot be performed in case of an even number of errors.

The check sum is a type of error detection. According to the check sum, the transmitter calculates all data transmitted to the receiver in a unit of word or bit. If the transmitter transmits the calculated result to the receiver, the receiver performs calculation in the same manner as the transmitter to detect an error.

The CRC is one of methods of detecting an error. For example, if the transmitter transmits data by adding a redundant frame check sequence (FCS) field thereto, the receiver can perform error check in the same manner as the transmitter.

The error correction code used for error control is a code representing a redundancy bit included in a data block so that the receiver can estimate what data transmitted thereto is. Examples of the error correction code include a block code and a convolution code.

The block code means a channel code that can allow the receiver to correct an error by adding redundancy information of a given length to information (signal) of a given length. Examples of the channel code include a linear code and a hamming code. Examples of a cyclic code include a Reed-Solomon code, a Bose Chaudhuri-Hocquenghem (BCH) code, and a cyclic redundancy code (CRC).

The convolutional code uses a previous signal and a current signal together when data are coded. Namely, since a convolutional coder has a memory, the previous signal can be used for error correction of the current signal.

DISCLOSURE OF INVENTION

Technical Problem

Accordingly, the present invention is directed to a method of error control, which substantially obviates one or more problems due to limitations and disadvantages of the related art.

An object of the present invention is to provide a method of error control, in which random linear coding (RLC) method is used to perform reliable communication.

Another object of the present invention is to provide a method of error control, in which error detection and error correction are performed when original packets are configured by recovering coded packets using a random linear coding (RLC) method. Particularly, error detection and error correction are performed while a rateless feature of the RLC is maintained.

Other object of the present invention is to provide a method of error control, in which error control is performed using only RLC without using separate CRC or FEC when communication is performed using the RLC.

Technical Solution

The present invention relates to a method of error control in a wireless access system, and more particularly, to a method of error control using a random liner coding method.

To achieve these objects and other advantages and in accordance with the purpose of the invention, as embodied and broadly described herein, in one aspect of the present invention, a method of error control in a wireless access system comprises receiving code blocks generated as data blocks included in a data block set are randomly linear-coded; decoding a predetermined number of code blocks to a first data block set, wherein the predetermined number of code blocks are selected from the code blocks; replacing one or more code blocks among the predetermined number of code blocks with code blocks other than the predetermined number of code blocks selected from the code blocks and decoding them to a second data block set; and comparing the first data block set with the second data block set.

The number of the code blocks is more than the number of the data blocks include in the data block set and less than the number of the data blocks twice.

The first data block set is decoded in such a manner that the predetermined number of code blocks are sequentially selected from the first code block among the code blocks and then decoded, and the second data block set is decoded in such a manner that the predetermined number of code blocks are selected in reverse order from the last code block among the code blocks and then decoded.

Furthermore, if the first data block set and the second data block set are different from each other after being compared with each other, the method further comprises decoding a predetermined number of code blocks to a third data block set, wherein the predetermined number of code blocks are randomly selected among the code blocks; and comparing the third data block set with either the first data block set or the second data block set to detect an error.

Furthermore, the number of the code blocks is more than the number of the data blocks included in the data block set twice or more.

At this time, if the number of the code blocks is an integer multiple of the number of the data blocks, the second data block set is decoded in such a manner that a predetermined number of another code blocks next to the predetermined number of code blocks are selected and then decoded.

If the number of the code blocks is an integer multiple of the number of the data blocks, the second data block set is decoded in such a manner that other code blocks are decoded as much as inverse numbers of the predetermined number of code blocks used for decoding of the first data block set.

Furthermore, the comparing step includes determining that an error has occurred if the first data block set and the second data block set are different from each other, the method further comprises replacing one or more code blocks among code blocks used when the first data block set and the second data block set are decoded with one or more code blocks which are not used when the first data block set and the second data block set are decoded, and decoding the code blocks to a third data block set; and comparing the third data block set with either the first data block set or the second data block set to detect an error.

In another aspect of the present invention, a method of error control in a wireless access system comprises configuring one or more data block sets of a predetermined number of data blocks by dividing data transferred from an upper layer; randomly linear-coding the predetermined number of data blocks among the one or more data block sets to generate code blocks more than the predetermined number of data blocks; and transmitting the code blocks.

The randomly linear-coded code blocks are independent from one another.

The number of the code blocks more than the predetermined number of data blocks is less than the number of the predetermined number of data blocks twice.

The number of the code blocks more than the predetermined number of data blocks is more than the number of the predetermined number of data blocks twice.

Code blocks to be used for error detection among the code blocks more than the predetermined number of data blocks are repeatedly transmitted a predetermined number of times or using higher power than that of other code blocks.

Advantageous Effects

According to the present invention, the following effects can be obtained.

First of all, according to the embodiments of the present invention, a user can perform error control using only RLC without using separate CRC or FEC. As a result, the user can perform prompt communication.

In addition, the present invention provides a method of detecting and correcting an error occurring in a communication channel when a transmitter and a receiver perform communication using RLC, whereby the user can perform communication having no error using a rateless feature of RLC without separate error detection and error correction.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
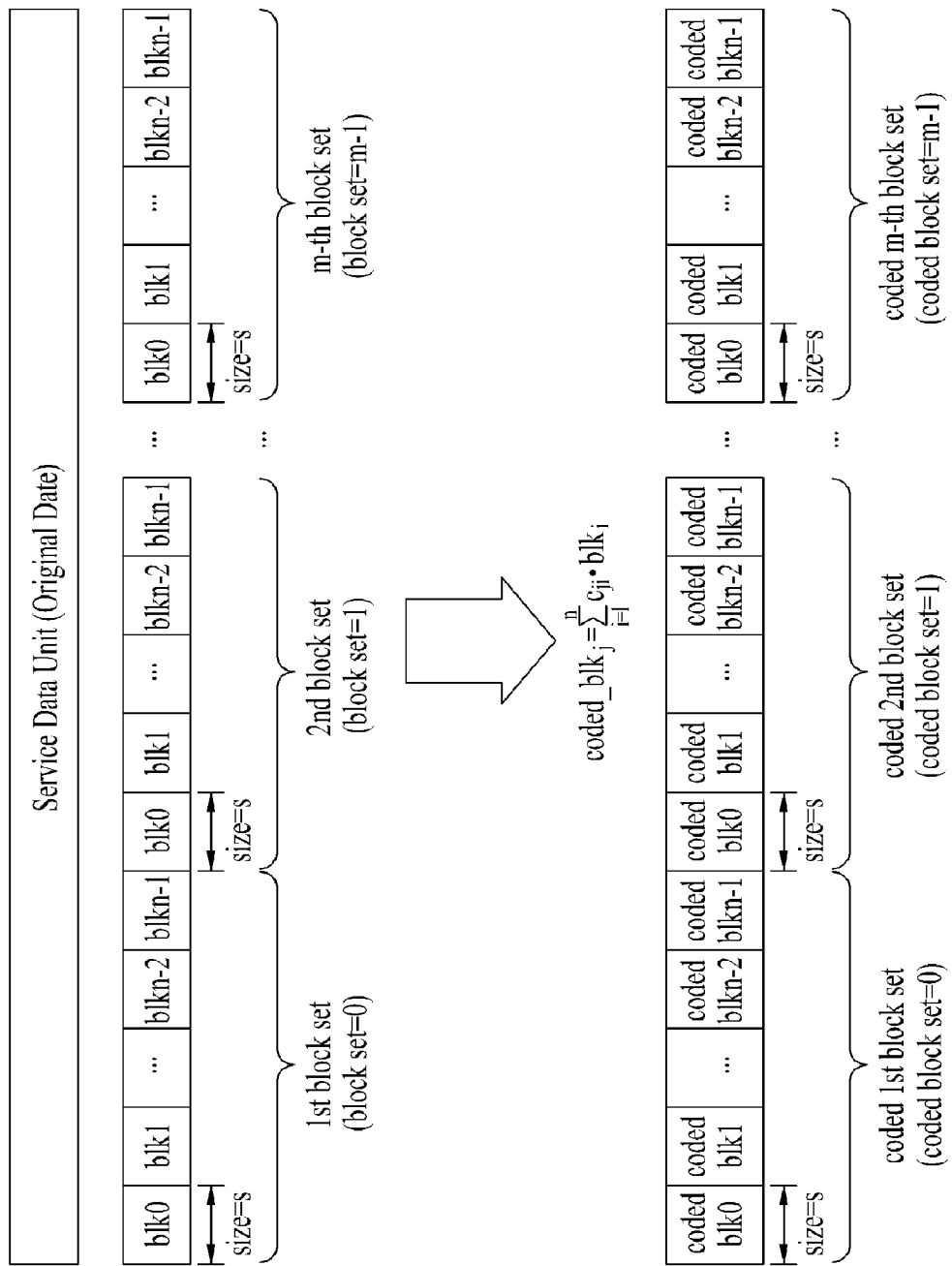
FIG. 1 is a diagram illustrating a procedure of coding data block sets using an RLC method that can be applied to the embodiment of the present invention.

To solve the aforementioned technical problems, the present invention is directed to a method of error control in a wireless access system. Also, the present invention is directed to a method of error control using a random linear coding method.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The base station may be replaced with terms such as a fixed station, Node B, eNode B (eNB), and access point. Also, the mobile station may be replaced with terms such as a user equipment and a mobile subscriber station.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting and receiving data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The embodiments of the present invention can be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify technical spirits of the present invention can be supported by the above standard documents. Also, all terminologies disclosed herein can be described by the above standard documents. Particularly, the embodiments of the present invention can be supported by one or more of standard documents of IEEE 802.16 system, i.e., P802.16-2004, P802.16e-2005 and P802.16Rev2.

Specific terminologies hereinafter described are provided to assist understanding of the present invention, and various modifications can be made in the specific terminologies within the range that they do not depart from technical spirits of the present invention.

In the embodiments of the present invention, data can be coded using a random linear coding (RLC) method. The random linear coding method is one of block coding methods.

The random linear coding method is characterized in that each coded block can include information of all blocks included in an original block set. Accordingly, even though some coded blocks are lost during transmission and reception, a receiver can promptly recover data by receiving another coded blocks without receiving the corresponding coded blocks again. The random linear coding method is only a term for defining a data processing method exemplarily disclosed in the present invention, and various modifications can be made in the term corresponding to the random linear coding method.

FIG. 1 is a diagram illustrating a procedure of coding data block sets using an RLC method that can be applied to the embodiment of the present invention.

Referring to FIG. 1, original data represents a service data unit transferred from an upper layer of a transmitter. The transmitter can divide original data into small blocks (or packets). The transmitter can configure block sets (or segments) by collecting a random number (n) of divided blocks.

At this time, the number (n) of block sets can be determined by channel status of a communication network, throughput information of the transmitter and the receiver, and requirements of an application program. Also, the transmitter can configure a total m number of original block sets.

The transmitter generates a random coefficient matrix ($c_{ji}$) for coding the divided data blocks. The transmitter can code the divided data blocks using the random coefficient matrix ($c_{ji}$) generated in accordance with a given rule.

The transmitter can perform coding using the RLC method in a unit of data block sets (for example, per n number of selected blocks). At this time, a set of n number of coded blocks can be referred to as a coded block set. The receiver can perform RLC decoding if n number of coded blocks are received. Hereinafter, since the coded block set is a code block set, the coded blocks will be referred to as code blocks.

Each code blocks generated using the RLC method can include information of all blocks included in the original block set. Accordingly, in order to recover a series of information blocks from the code blocks received by the receiver, random coefficients used to code n number of code blocks and data blocks are required.

The transmitter generates new random coefficients until the receiver fully decodes data, and generates code blocks to transmit them to the receiver. At this time, n number of code blocks do not need to be transmitted to the receiver in the coded order, and are independent from each other.

The following Equation 1 illustrates an example of a method of generating a code block set ($\overline{E}$) generated by coding an original block set ($\overline{S}$).

$$\overline{E} = \overline{H} \times \overline{S} \qquad \text{[Equation 1]}$$

In the Equation 1, $\overline{H}$ means a coefficient matrix and represents a method of combining original block sets ($\overline{S}$). A method of generating a coefficient matrix ($\overline{H}$) will be described as follows.

The coefficient matrix ($\overline{H}$) used in the RLC method can be generated using a random number determined by either the transmitter or both the transmitter and the receiver within a given range. The random number means a number randomly extracted from given numbers (for example, 0~255) determined by either the transmitter or consultation between the transmitter and the receiver. Also, the transmitter and the receiver can generate a coefficient matrix ($\overline{H}$) by sharing a seed value required to generate a random coefficient. At this time, a size of the coefficient matrix ($\overline{H}$) can be defined as n×n.

The following Equation 2 illustrates another expression of the above Equation 1.

$$\text{coded\_blk}_j = \sum_{i=1}^{n} c_{ji} blk_i \qquad \text{[Equation 2]}$$

In the Equation 2, a code block can be expressed as coded-$\text{blk}_j$, and a coefficient matrix can be expressed as $c_{ji}$. Also, an original block can be expressed as $\text{blk}_i$.

If the transmitter transmits all of n number of code blocks of the first code block set and the receiver receives the n number of code blocks, the original block set can be recovered. Afterwards, the transmitter transmits code blocks included in the second block set. In this way, data communication is performed.

Hereinafter, a method of controlling an error using an RLC method in accordance with the preferred embodiments of the present invention will be described.

In order to perform communication using the RLC method, a size of a data block set, a size of a coded block, and a Galois field (GF) of a random coefficient are defined. The GF can be defined as follows. In case of GF($2^2$), symbols of 2 bits are calculated, and in case of GF($2^8$), symbols of 8 bits are calculated.

If the size of the data block set and the size of the code block are defined, the number of coded blocks required for decoding can be determined. Random coefficients required for coding can be generated in accordance with the defined Galois field to perform coding. The random coefficients may be transmitted together with the coded blocks when the coded blocks are transmitted. Alternatively, only index of a random coefficient used when the transmitter and the receiver decode each code block using the same information may be transmitted. In case of sequential data transmission in which a transmitted signal is not lost during communication, previously defined random coefficients can sequentially be used for coding and decoding.

Figure 2:
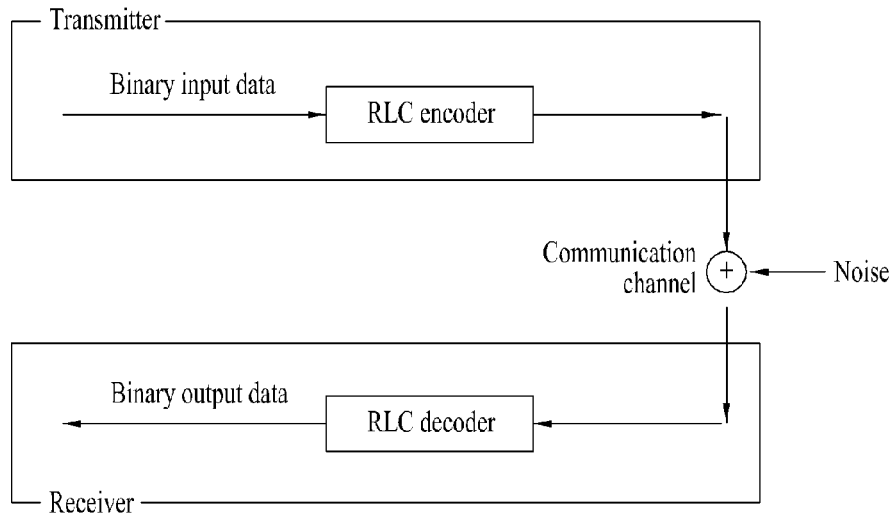
FIG. 2 is an RLC block diagram according to one embodiment of the present invention.

FIG. 2 is a diagram illustrating RCL block according to one embodiment of the present invention.

In FIG. 2, the transmitter includes a random linear encoder, and the receiver includes a random linear decoder. It is assumed that the transmitter and the receiver are connected with each other through a virtual communication channel.

Referring to FIG. 2, binary input data are input to the random linear encoder of the transmitter. The binary input data represent $b_1, b_2, \ldots, b_{k-1}, b_k, b_{k+1}, \ldots, b_{n-1}, b_n, b_{n+1}, \ldots, b_{2n}$. The binary input data are input to the random linear encoder and then encoded using the RLC method. It is assumed that the encoded binary input data are $x_1, x_2, \ldots, x_{n-1}, x_n$. One data block set is configured by n number of binary input data blocks, and one code block set is configured by n number of coded blocks connected with one another. Also, the random coefficients generated in the Galois field defined in FIG. 1 can be represented by $C_{ji}$ (i=1, 2, ..., n; j>n).

The code block coded through the RLC will be referred to as $y_j$(j>n). RLC coding can be performed using the Equation 2. At this time, if the Equation 2 is expressed in a matrix type, the following Equation 3 can be obtained.

$$\begin{bmatrix} y_1 \\ y_2 \\ \ldots \\ \ldots \\ \ldots \\ y_{j-1} \\ y_j \end{bmatrix} = \begin{bmatrix} c_{1,1} & c_{1,2} & \ldots & c_{1,n-1} & c_{1,n} \\ c_{2,1} & c_{2,2} & \ldots & c_{2,n-1} & c_{2,n} \\ \ldots & \ldots & \ldots & \ldots & \ldots \\ \ldots & \ldots & \ldots & \ldots & \ldots \\ \ldots & \ldots & \ldots & \ldots & \ldots \\ c_{j-1,1} & c_{j-1,2} & \ldots & c_{j-1,n-1} & c_{j-1,n} \\ c_{j,1} & c_{j,2} & \ldots & c_{j,n-1} & c_{j,n} \end{bmatrix} \cdot \begin{bmatrix} x_1 \\ x_2 \\ \ldots \\ \ldots \\ \ldots \\ x_{n-1} \\ x_n \end{bmatrix} \quad \text{[Equation 3]}$$

The transmitter transmits the code blocks $y_1, y_2, \ldots, y_{n-1}, y_n, y_{n+1}, \ldots, y_{j-1}, y_j$ to the receiver through a communication channel. Likewise, the transmitter can transmit n number of code blocks corresponding to the code block set. 'j' is a number which determines a coding rate. Also, T represents the number of code blocks to be transmitted from the transmitter to the receiver (or received by the receiver). At this time, it is assumed that the code blocks transmitted from the transmitter are all transmitted to the receiver.

One code block set includes n number of code blocks. However, in the embodiment of the present invention, for error control using RLC, the transmitter generates j number of code blocks using the same random coefficient and then transmits the generated code blocks to the receiver.

The RLC has a rateless feature of a coding rate varied depending on the number of code blocks instead of a previously determined coding rate. For example, in case of n=10 and j=20, the code block set is configured by ten code blocks and the number of code blocks generated by and transmitted from the transmitter using the RLC is twenty. At this time, a coding rate of 1/2 (10/20) is obtained.

The 'j' is varied depending on a communication channel status to enhance reliability. Referring to FIG. 2, when the code blocks are transmitted to the receiver through the communication channel, an error may occur due to noise. At this time, the code blocks transmitted to the receiver will be referred to as $y_1', y_2', \ldots, y_{n-1}', y_n', y_{n+1}', \ldots, y_{j-1}', y_j'$ and the decoded data blocks will be referred to as $x_1', x_2', \ldots, x_{n-1}', x_n'$. The receiver selects code blocks required to recover the original data block set among the received code blocks and then performs RLC decoding. Namely, the receiver selects n number of code blocks from the received code blocks (j number of code blocks) and then performs RLC decoding.

For error detection, the j number of code blocks received by the receiver should be more than n+1. Namely, the number of code blocks transmitted from the transmitter should be more than the n number of code blocks required for RLC decoding as much as one or greater.

For example, the receiver selects n number of code blocks among j number of the received code blocks and decode them to recover the original data block set. Also, the receiver again selects at least one or more another code blocks among the decoded code blocks to recover the original data block set. The receiver compares the recovered original data block sets with each other, and if the two data block sets are equal to each other, determines that an error has not occurred, and if not so, determines that an error has occurred.

In other words, it is assumed that the first RLC decoded data blocks will be referred to as $x_1^1, x_2^1, \ldots, x_{n-1}^1, x_n^1$, and the subsequent decoded data blocks will be referred to as $x_1^2, x_2^2, \ldots, x_{n-1}^2, x_n^2$. At this time, the data blocks having no error correspond to $x_1^1=x_1^2, x_2^1=x_2^2, \ldots, x_n^1=x_n^2$. Error detection can be identified in such a manner that the data blocks RLC decoded by different number of n code blocks are compared with one another.

The following Equation 4 illustrates a method of detecting an error using Gauss-Jordan Elimination.

$$\begin{bmatrix} x_1' \\ x_2' \\ \ldots \\ \ldots \\ \ldots \\ x_{n-1}' \\ x_n' \end{bmatrix} = \begin{bmatrix} 1 & c_{1,2}' & \ldots & c_{1,n-1}' & c_{1,n}' \\ 0 & 1 & \ldots & c_{2,n-1}' & c_{2,n}' \\ \ldots & \ldots & \ldots & \ldots & \ldots \\ \ldots & \ldots & \ldots & \ldots & \ldots \\ \ldots & \ldots & \ldots & \ldots & \ldots \\ 0 & 0 & \ldots & 1 & c_{n-1,1}' \\ 0 & 0 & \ldots & 0 & c_{n,1}' \end{bmatrix} \cdot \begin{bmatrix} y_1'' \\ y_2'' \\ \ldots \\ \ldots \\ \ldots \\ y_{n-1}'' \\ y_n'' \end{bmatrix} \quad \text{[Equation 4]}$$

If Gauss-Jordan Elimination is used, the receiver can easily detect an error by replacing the last row ($y''_n$) of a code block to be decoded with another code block and comparing them with each other. Referring to the Equation 4, $x_1', x_2', \ldots, x_{n-1}', x_n'$ and $y_1'', y_2'', \ldots, y_n''$ mean values changed from initial values by row operation occurring when Gauss-Jordan Elimination is used.

The receiver can make the type of the Equation 4 if n number of code blocks are received. The receiver can obtain decoded data block sets $x_1^1, x_2^1, \ldots, x_{n-1}^1, x_n^1$ using the type of the Equation 4. Also, the receiver can obtain another decoded data block sets $x_1^2, x_2^2, \ldots, x_{n-1}^2, x_n^2$ by replacing one of the received code blocks with the last row, i.e., nth row of the Equation 4 and operating it.

Among the received code blocks, redundant code blocks which are not used for decoding are used as the code blocks for error detection in the Equation 4. Also, the code blocks may have an error when the receiver detects an error. Accordingly, if the number of the redundant code blocks is more than 2, the receiver can replace the two or more code blocks with another code blocks and compare them each other to improve reliability of error detection.

The transmitter needs to transfer the code blocks to be used for error detection to the receiver more exactly. Namely, the transmitter can repeatedly transmit a plurality of code blocks to be used for error detection to the receiver or use higher power for code blocks to be used for error detection, so as to obtain better receiving SNR (signal to noise ratio). In this case, the transmitter can transfer the code blocks to the receiver without error.

For error correction, the receiver can make n number of code block sets by sequentially replacing a predetermined number of code blocks among the received code blocks. Also, the receiver can determine whether same original data blocks are recovered by decoding the n number of code block sets, thereby determining whether an error has occurred. For example, it is assumed that the number (n) of code blocks required for decoding is 3 and the number (j) of the received code blocks is 5. At this time, the receiver can perform RLC decoding by optionally selecting three code blocks among the received five code blocks. For example, since $$\binom{5}{3} = \frac{5!}{3!_5(5-3)!} = \frac{120}{12} = 10$$

is obtained, the receiver can perform RLC decoding ten times using different code block combinations. A method for RLC decoding code blocks will be described with reference to FIG. 3 and FIG. 4.

Figure 3:
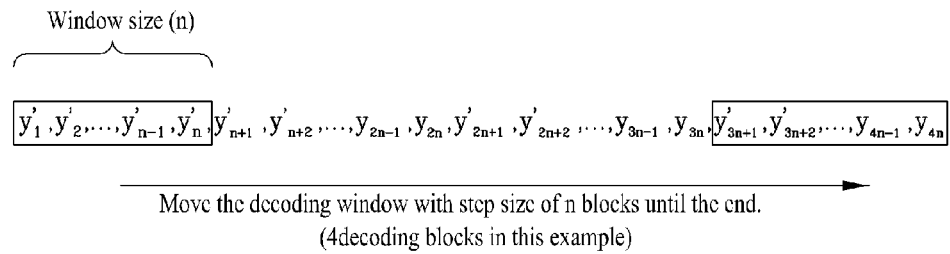
FIG. 3 is a diagram illustrating a method of decoding a code block received in a receiver in accordance with another embodiment of the present invention.
Figure 3:
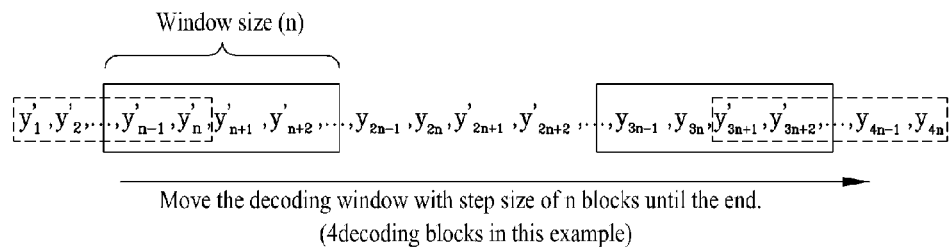

FIG. 3 is a diagram illustrating a method for decoding code blocks received by a receiver in accordance with another embodiment of the present invention.

In FIG. 3(a) and FIG. 3(b), it is assumed that received code blocks are $y_1', y_2', \ldots, y_{n-1}', y_n', y_{n+1}', \ldots, y_{j-1}', y_j'$. The receiver can vary a method of correcting an error in accordance with a size of j.

A method of detecting an error when the number (j) of code blocks received by the receiver is more than the number (n) of code blocks required for RLC decoding twice or more and corresponds to an integer multiple of n (i.e., j>2n and j=k*n (k is an integer)) will be described with reference to FIG. 3(a).

The receiver sets a size of a window to n as illustrated in FIG. 3(a). The receiver can perform decoding by moving the window by n. For example, FIG. 3(a) illustrates j=4n, wherein the receiver can perform RLC decoding four times using received code blocks. The receiver can detect an error by comparing data block sets recovered through decoding with each other. At this time, if an error occurs in the method of FIG. 3(a), the receiver can perform decoding by moving the window by one code block.

Referring to FIG. 3(a), the receiver can again perform RLC decoding by moving the window by 1/n from the first code block as illustrated in FIG. 3(b). In this case, the number of decoded code blocks increases. Namely, the receiver performs decoding by changing the code blocks per one.

Figure 4:
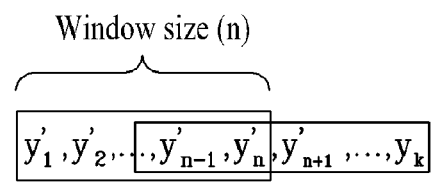
FIG. 4 is a diagram illustrating a method of decoding a code block received in a receiver in accordance with other embodiment of the present invention.
Figure 4:
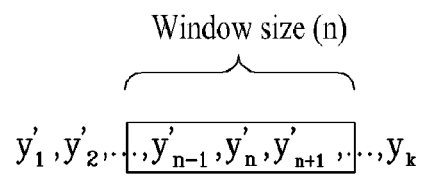
Figure 4:
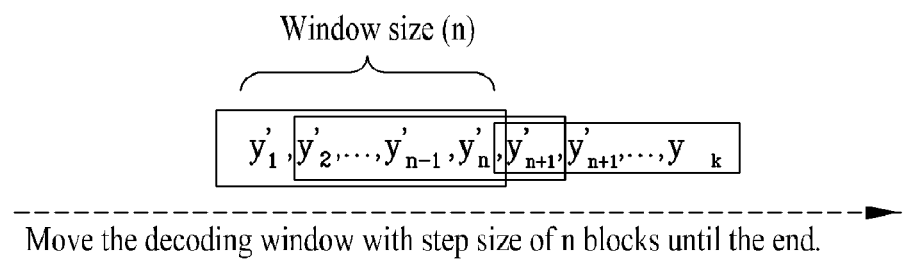

FIG. 4 is a diagram illustrating a method for decoding code blocks received by a receiver in accordance with other embodiment of the present invention.

In FIG. 4, it is assumed that received code blocks are $y_1', y_2', \ldots, y_{n-1}', y_n', y_n', \ldots, y_{k-1}', y_k'$. The receiver can vary a method of correcting an error in accordance with a size of k. In FIG. 4, it is assumed that the number (k) of received code blocks is more than the number (n) of code blocks required for decoding and less than 2n.

Referring to FIG. 4(a), the receiver can decode first n number of code blocks and also perform decoding by selecting n number of code blocks starting from the last code block. The receiver can detect whether an error has occurred, by comparing a data block set where first n number of code blocks are recovered with a data block set where last n number of code blocks are recovered.

Also, after randomly selecting n number of code blocks as illustrated in FIG. 4(b), the receiver can recover a specific data block set by decoding the selected code blocks. The receiver can recover a data block set using first n number of code blocks and also recover a data block set using last n number of code blocks. Namely, the receiver can detect an error by comparing the recovered specific data block set with the last data block set.

Although the last block set has been used as one example, the first block set or a predetermined block set can be used as a comparison set for error detection in accordance with a user's requirements.

Furthermore, the receiver can detect an error by performing decoding while moving a window per one code block as illustrated in FIG. 4(c).

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention can be applied to various wireless access systems. Examples of various wireless access systems include 3GPP (3rd Generation Partnership Project) system, 3GPP2 system and/or IEEE 802.xx (Institute of Electrical and Electronic Engineers 802) system. The embodiments of the present invention can be applied to all technical fields to which the various access systems are applied, as well as the various access systems.

The invention claimed is:

1. A method of error control in a wireless access system, the method comprising:
   receiving code blocks generated from data blocks via random linear coding (RLC),
   wherein the data blocks are included in a data block set;
   decoding a predetermined number of code blocks to a first data block set, wherein the predetermined number of code blocks are selected from the received code blocks;
   replacing one or more code blocks among the predetermined number of code blocks with code blocks other than the predetermined number of code blocks selected from the received code blocks and decoding them to a second data block set; and
   comparing the first data block set with the second data block set,
   wherein each of the code blocks includes information of all data blocks in the data block set.

2. The method of claim 1, wherein a number of the code blocks is more than a number of the data blocks include in the data block set and less than the number of the data blocks twice.

3. The method of claim 2, wherein the first data block set is decoded in such a manner that the predetermined number of code blocks are sequentially selected from the first code block among the code blocks and then decoded, and the second data block set is decoded in such a manner that the predetermined number of code blocks are selected in reverse order from the last code block among the code blocks and then decoded.

4. The method of claim 2, if the first data block set and the second data block set are different from each other after being compared with each other, further comprising:

decoding a predetermined number of code blocks to a third data block set, wherein the predetermined number of code blocks are randomly selected among the code blocks; and comparing the third data block set with either the first data block set or the second data block set to detect an error.

5. The method of claim 2, wherein the comparing step includes determining that an error has occurred if the first data block set and the second data block set are different from each other, the method further comprising:

replacing one or more code blocks among code blocks used when the first data block set and the second data block set are decoded with one or more code blocks which are not used when the first data block set and the second data block set are decoded, and decoding the code blocks to a third data block set; and comparing the third data block set with either the first data block set or the second data block set to detect an error.

6. The method of claim 1, wherein a number of the code blocks is more than a number of the data blocks included in the data block set twice or more.

7. The method of claim 6, wherein if the number of the code blocks is an integer multiple of the number of the data blocks, the second data block set is decoded in such a manner that a predetermined number of another code blocks next to the predetermined number of code blocks are selected and then decoded.

8. The method of claim 6, wherein if the number of the code blocks is an integer multiple of the number of the data blocks, the second data block set is decoded in such a manner that other code blocks are decoded as much as inverse numbers of the predetermined number of code blocks used for decoding of the first data block set.

9. The method of claim 6, wherein the comparing step includes determining that an error has occurred if the first data block set and the second data block set are different from each other, the method further comprising:

replacing one or more code blocks among code blocks used when the first data block set and the second data block set are decoded with one or more code blocks which are not used when the first data block set and the second data block set are decoded, and decoding the code blocks to a third data block set; and comparing the third data block set with either the first data block set or the second data block set to detect an error.

10. A method of error control in a wireless access system, the method comprising:

configuring one or more data block sets of a predetermined number of data blocks by dividing data transferred from an upper layer;

performing random linear-coding (RLC) on the predetermined number of data blocks among the one or more data block sets to generate code blocks more than the predetermined number of data blocks; and transmitting the code blocks, wherein each of the code blocks includes information of all data blocks in the data block set.

11. The method of claim 10, wherein the randomly linear-coded code blocks are independent from one another.

12. The method of claim 10, wherein a number of the code blocks more than the predetermined number of data blocks is less than the number of the predetermined number of data blocks twice.

13. The method of claim 10, wherein a number of the code blocks more than the predetermined number of data blocks is more than the number of the predetermined number of data blocks twice or more.

14. The method of claim 12, wherein code blocks to be used for error detection among the code blocks more than the predetermined number of data blocks are repeatedly transmitted a predetermined number of times or using higher power than that of other code blocks.

15. The method of claim 13, wherein code blocks to be used for error detection among the code blocks more than the predetermined number of data blocks are repeatedly transmitted a predetermined number of times or using higher power than that of other code blocks.

* * * * *